United States Patent
Lee

(10) Patent No.: US 7,553,907 B2
(45) Date of Patent: Jun. 30, 2009

(54) ANTISTATIC ARTICLES OF MELT PROCESSIBLE FLUOROPOLYMER

(75) Inventor: Jeong Chang Lee, Shimizu (JP)

(73) Assignee: DuPont-Mitsui Fluorochemicals Co Ltd, Tokyo (JP)

( * ) Notice: Subject to any disclaimer, the term of this patent is extended or adjusted under 35 U.S.C. 154(b) by 8 days.

(21) Appl. No.: 10/924,354

(22) Filed: Aug. 23, 2004

(65) Prior Publication Data

US 2005/0054777 A1    Mar. 10, 2005

(30) Foreign Application Priority Data

Aug. 29, 2003    (JP) .............................. 2003-306028

(51) Int. Cl.
*C08L 27/12*    (2006.01)
*C08F 214/26*   (2006.01)

(52) U.S. Cl. .................. 525/199; 525/200; 428/32.22

(58) Field of Classification Search ............... 525/199; 252/511, 54; 524/495, 496
See application file for complete search history.

(56) References Cited

U.S. PATENT DOCUMENTS

| | | | |
|---|---|---|---|
| 3,429,845 A | 2/1969 | Bechtold et al. | |
| 4,380,618 A | 4/1983 | Khan et al. | |
| 4,664,846 A * | 5/1987 | Enjo et al. | 252/511 |
| 4,982,009 A | 1/1991 | Hung | |
| 5,134,211 A | 7/1992 | Farnham et al. | |
| 5,637,748 A | 6/1997 | Hung et al. | |
| 5,674,671 A * | 10/1997 | Brandon et al. | 430/527 |
| 6,061,545 A * | 5/2000 | Cerrah | 399/330 |
| 6,419,615 B1 * | 7/2002 | Chen et al. | 492/56 |
| 6,645,555 B1 * | 11/2003 | Araki et al. | 427/195 |
| 2001/0006727 A1 * | 7/2001 | Lee et al. | 428/373 |
| 2003/0004257 A1 * | 1/2003 | Kondo et al. | 524/495 |

FOREIGN PATENT DOCUMENTS

| | | |
|---|---|---|
| EP | 0 856 529 A1 | 8/1998 |
| EP | 0 902 049 A1 | 3/1999 |
| EP | 1 162 244 A1 | 12/2001 |
| JP | 62-223255 | 10/1987 |
| JP | 2-255751 | 10/1989 |
| WO | WO 01/48280 A1 | 7/2001 |
| WO | WO 03/035392 A1 | 5/2003 |

* cited by examiner

*Primary Examiner*—Vasu Jagannathan
*Assistant Examiner*—Gennadiy Mesh

(57) ABSTRACT

Melt processible fluoropolymer containing functional groups such as hydroxyl and nitrile have antistatic properties that make them suitable in articles and parts for use in conditions where static electricity can be a problem, such as copying machines and fuel lines.

12 Claims, No Drawings

ANTISTATIC ARTICLES OF MELT PROCESSIBLE FLUOROPOLYMER

FIELD OF THE INVENTION

This invention relates to melt processible fluoropolymer articles able to dissipate static charge.

BACKGROUND OF THE INVENTION

Melt processible fluoropolymers such as tetrafluoroethylene/perfluoro(alkyl vinyl ether) copolymers (PFA) and tetrafluoroethylene/hexafluoropropylene copolymer (FEP) have excellent heat and chemical resistance. However, these fluoropolymers also have very high electrical resistance at their surfaces, and as a result they easily accumulate static charge, and are slow to dissipate the charge.

In electrostatic copy machines, rotating parts such as, belts, tubes, and rolls, made of melt processible fluoropolymers are used. Because of static charge accumulation on the parts, image quality can be affected adversely. Therefore it is desirable that these articles have antistatic character, by which is meant that they have sufficient surface conductivity to prevent accumulation of static charge to the point that the static charge affects the good operation of the apparatus, such as a copy machine.

Melt processible fluoropolymer-based wafer carriers used in the semiconductor production process, chemical solution pipelines, and parts such as joints, are generally used in service that requires a high degree of cleanliness. If such articles accumulate static charge, they can attract microparticles from the atmosphere to the detriment of the quality of parts or materials with which they come in contact. Furthermore, in pipelines transporting combustible liquids, the passage of the liquids through the pipe generates static electricity, which can lead to sparking, a fire hazard Conventionally, antistatic fluoropolymer compositions are made by blending with an electrically conductive powder, and molding articles therefrom. For example, in U.S. Pat. No. 4,664,846 and Japanese Kokai Patent Nos. SHO 62[1987]-223255 and HEI 2[1990]-255751, polymer compositions made from fluoropolymer mixed with electrically conductive materials such as carbon black and carbon fiber, fibrous conductive titanium oxide, and zinc oxide are disclosed.

However, imparting antistatic properties to fluoropolymers by mixing with electrically conductive materials can give rise to contamination if the added material is released, such as by abrasion or wear.

There is a need for melt processible fluoropolymers able to dissipate static electrical charge without the need for blending with conductive powders.

SUMMARY OF THE INVENTION

The present invention satisfies this need by the discovery that certain functional groups, viz. hydroxyl and nitrile, incorporated into the fluoropolymer, provide for the efficient dissipation of electrostatic charge so that the blending of electrically conductive material into the fluoropolymer is unnecessary. Thus in one embodiment, the present invention provides an antistatic article comprised of antistatic melt processible fluoropolymer composition consisting essentially of: (A) 99.5-0 wt % of a first melt processible fluoropolymer and (B) 0.5-100 wt % of a second melt processible fluoropolymer having at least one functional group selected from the group consisting of hydroxyl group and nitrile group.

In another embodiment, the present invention provides a covering material comprised of antistatic melt processible fluoropolymer composition consisting essentially of: (A) 99.5-0 wt % of a first melt processible fluoropolymer and (B) 0.5-100 wt % of a second melt processible fluoropolymer having at least one functional group selected from the group consisting of hydroxyl group and nitrile group, said covering material being of particular utility as a copy roll cover in an electrostatic imaging machine.

In yet another embodiment, in the process of dissipating electrostatic charge on the surface of an article of fluoropolymer by dispersing electrically conductive material into said fluoropolymer, the improvement comprising substituting for said fluoropolymer having said electrically conductive material dispersed therein, a composition consisting essentially of: (A) 99.5-0 wt % of a first melt processible fluoropolymer and (B) 0.5-100 wt % of a fluoropolymer having at least one functional group selected from the group consisting of hydroxyl group and nitrile group.

DETAILED DESCRIPTION

According to the present invention, functional-group-containing melt processible fluoropolymer, or blends of functional-group-containing melt processible fluoropolymer with melt processible fluoropolymer that contains no functional groups, confer antistatic property on articles fabricated from the compositions without impairing the properties for which fluoropolymers are valued, such as chemical and thermal resistance. By antistatic property is meant the ability to dissipate static charge rapidly enough to limit charge accumulation to acceptable levels. These will depend on the particular application.

Furthermore, the charge dissipation character of melt processible fluoropolymer compositions can be controlled at a desired level by controlling the amount of functional-group-containing melt processible fluoropolymer in the blend.

Articles formed from the melt processible fluoropolymer compositions of the present invention have antistatic properties and are expected to perform well in applications in areas in which static electricity problems may be encountered.

The present invention provides antistatic, melt processible fluoropolymer compositions consisting of (A) 99.5-01 wt % of a melt processible fluoropolymer and (B) 0.5-100 wt % of a melt processible fluoropolymer having at least one functional group selected from a group consisting of hydroxyl group and nitrile group.

The antistatic melt processible fluoropolymer compositions of the present invention are antistatic melt processible fluoropolymer compositions that retain the heat resistance, chemical resistance, and other properties, associated with fluoropolymers.

In the present invention, the melt processible fluoropolymers (A) are polymers of fluoromonomers such as perfluoroolefins such as tetrafluoroethylene (TFE) and hexafluoropropylene (HFP), fluoroolefins such as: chlorofluoroolefins such as chlorotrifluoroethylene (CTFE), fluoro(alkyl vinyl ethers) including per fluoro(alkyl vinyl ethers) (PAVE) such as perfluoro(propyl vinyl ether) (PPVE), perfluoro(ethyl vinyl ether) (PEVE), and perfluoro(methyl vinyl ether) (PMVE), copolymers of fluorohydroolefins, such as vinylidene fluoride ($VF_2$) or vinyl fluoride (VF), or copolymers of the above with hydrocarbon monomers, such as ethylene and propylene, preferably ethylene.

Preferred fluoroolefins are, e.g., TFE, CTFE, HFP, PAVE, $VF_2$, and VF. Preferred specific examples of the melt processible fluoropolymers (A) of the present invention include the perfluoropolymers TFE/PAVE (hereinafter referred to as PFA), TFE/HFP (hereinafter referred to as FEP), tetrafluoroethylene/hexafluoropropylene-perfluoro(alkyl vinyl ether) copolymer (hereinafter referred to as EPE), and non-perfluoropolymers such as TFE/ethylene copolymer (hereinafter referred to as ETFE), polyvinylidene fluoride (hereinafter referred to as PVDF), polychlorotrifluoroethylene (hereinafter referred to as PCTFE), CTFE/ethylene copolymer (hereinafter referred to as ECTFE).

The melt processable fluoropolymers (A) may the individual polymers disclosed above, or may be blends of two or more of the above polymers.

The functional-group-containing melt processable fluoropolymers (B) of the present invention are melt processable fluoropolymers having at least one functional group selected from a hydroxyl group (—OH) and nitrile group (—CN).

Functional groups such as sulfonic acid or sulfonate salt, or carboxylic acid or carboxylate salt, or precursors that could be converted to these groups, are unsuitable because they are ionic and have ion exchange capacity. These and other functional groups that possess ionic character under normal conditions of ambient temperature and humidity can vary in their ability to dissipate static charge depending up temperature and humidity conditions. Such variability is undesirable. Furthermore, because of the ion exchange capability of these functional groups, cleanliness can be compromise, the groups being capable of picking up and releasing cations depending up conditions of operation and environment.

It is preferred that such functional groups are introduced into the melt processable fluoropolymers (B) by copolymerizing functional-group-containing monomers with one or more of the fluoromonomers listed above as possible components of fluoropolymer (A).

Functional-group-containing fluoromonomers are, e.g., fluorovinyl ether compounds represented by formula (1) shown below.

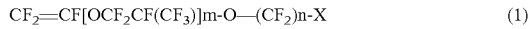

CF$_2$=CF[OCF$_2$CF(CF$_3$)]m-O—(CF$_2$)n-X       (1)

(In the formula, m is 0-3; n is 0-4; and X represents —CH$_2$OH or —CN,

Preferred specific examples of the fluorovinyl ether compounds represented by the formula (1) are fluorovinyl ether compounds represented by the formula (2), and (3) shown below:

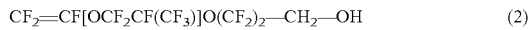

CF$_2$=CF[OCF$_2$CF(CF$_3$)]O(CF$_2$)$_2$—CH$_2$—OH       (2)

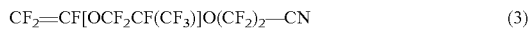

CF$_2$=CF[OCF$_2$CF(CF$_3$)]O(CF$_2$)$_2$—CN       (3)

Synthesis of (2) is disclosed in U.S. Pat. No. 4,982,009, Example 1.

Synthesis of (3) is disclosed in U.S. Pat. No. 5,637,748, Examples 7 and 8.

The functional-group-containing fluoromonomer is copolymerized in an amount of about 0.5-15 wt %, preferably about 1-10 wt %, in the functional-group-containing melt processable fluoropolymer (B). If the functional-group-containing monomer content is too low, the antistatic effect is not sufficient. With an excessively high content, interaction among the functional groups may cause behavior like crosslinking, making melt fabrication difficult, and causing poor heat resistance.

There are no special limits on the viscosity and molecular weight of the functional-group-containing melt processable fluoropolymers (B). Preferably, they do not exceed those of the melt processable fluoropolymers (A), and about the same viscosity level is more preferred. For melt processability, viscosity should be in the range of $10^2$ to $10^6$ Pa·s, preferably $10^3$ to $10^5$ Pa·s, measured according to ASTM D-1238 as described in U.S. Pat. No. 4,380,618.

The melt processable fluoropolymer compositions of the present invention are antistatic melt processable fluoropolymer compositions preferably consisting essentially of about 99-1 wt % of melt processable fluoropolymer (A) and about 1-99 wt % of functional-group-containing melt processable fluoropolymer (B).

The content of the functional-group-containing melt processable fluoropolymer (B) of the present invention may vary depending on the type and content of the functional group, while it may be about 1-99 wt %, preferably it is at least about 1 wt %, more preferably at least about 4 wt %, and no more than about 20 wt %, preferably no more than about 16 wt %, more preferably no more than about 12 wt %, these amounts being with respect to the total polymer content of the melt processable fluoropolymer composition.

The functional-group-containing melt processable fluoropolymer (B) may be used alone or blended with one or more polymers having different functional groups and/contents.

The melt processable fluoropolymer compositions of the present invention include the case involving 100 wt % of functional-group-containing melt processable fluoropolymer (B) being contained in the melt processable fluoropolymer composition. Namely, the melt processable fluoropolymer composition in this case contains the functional-group-containing melt processable fluoropolymer (B) alone.

When melt processable fluoropolymer (B) is used unblended with melt processable fluoropolymer having no functional groups (A), the antistatic characteristics are controlled by varying functional group content. When the functional-group-containing melt processable fluoropolymers (B) is blended with the melt processable fluoropolymers (A), antistatic characteristics of the melt processable fluoropolymer compositions are controlled by varying the functional group content in the functional-group-containing melt processable fluoropolymers (B) and/or the ratio of (B) to (A). The charge dissipation and charge characteristics needed for the antistatic melt processable fluoropolymer compositions are varied according to the needs of the particular application. The desired mixing ratio according to this invention is one that provides a residual charge of less than about 1.5 kV, preferably less than about 1.3 kV, and more preferably less than about 1.0 kV, as measured by the method described below.

In the case of using functional-group-containing melt processable fluoropolymer (B) with a given functional-group content blended with melt processable fluoropolymer (A), the greater the amount of functional-group-containing fluoropolymer (B), the greater the antistatic properties While it is possible to have functional-group-containing melt processable fluoropolymers (B) with amounts of functional group tailored to the particular application requiring antistatic character in the polymer, having many polymer compositions is costly. It is preferable to make one functional-group-containing melt processable fluoropolymer having a functional group concentration sufficient to meet the most demanding antistatic application. Where antistatic requirements are less stringent or where there can be too much conductivity for an application, the functional-group-containing melt processable fluoropolymer (B) can be blended with nonfunctional fluoropolymer (A), to arrive at the desired concentration of functional groups in the resulting blend.

The melt processable fluoropolymers obtained by mixing the functional-group-containing melt processable fluoropolymer (B) and melt processible fluoropolymer (A) are preferred as the antistatic melt processible fluoropolymer compositions of the present invention.

When the functional-group-containing melt processible fluoropolymer (B) is used together with melt processible fluoropolymer (A), the viscosity and molecular weight of the functional-group-containing melt processible fluoropolymer (B) should not exceed those of the melt processible fluoropolymer (A).

If needed, the antistatic melt processible fluoropolymer compositions may also contain additives, such as antioxidants, light stabilizers, fluorescent whiteners, colorants, carbon black, graphite, alumina, mica, silicon carbide, boron nitride, titanium oxide, bismuth oxide, bronze, gold, silver, copper, and nickel, in powder or fiber form. Nano materials such as fullerene (C60), and carbon nanotubes, which have recently been produced in large quantities and are commercially available, can also be used as additives. However, the compositions are preferably free of electrically conductive material that would impart antistatic character, i.e. functional-group-containing melt processible fluoropolymer provides the antistatic character to the antistatic article of the present invention.

Also, within the scope of the present invention, other polymers may be added.

In the present invention, the melt processible fluoropolymer (A) and the functional-group-containing melt processible fluoropolymer (B) may be mixed by, but not limited to, the ordinary melt kneading method, dry blending method, and wet blending method. In melt kneading using an extruder, extruders having a high shear rate are preferred, and using a twin-screw extruder is better than a single-screw extruder. Dry blending may be done for example by e.g., a V—(i.e. double-cone) blender, tumbler, Henschel mixer, or high-speed mixer (e.g., cutter mixer,) Wet blending may be done by the mixing of aqueous dispersions or organosols.

The articles of the present invention may be stand-alone moldings, such as extruded shapes, tubing, or compression moldings, laminates, self-supporting (free-standing) films, and coatings. Preferred examples are parts for semiconductor production. They may also be fibers, and fabrics containing such fibers, including nonwoven as well as woven fabrics. Examples of products coated with the antistatic melt processible fluoropolymer compositions include parts for imaging devices, such as copy roll covers.

The articles of the present invention may be obtained by an ordinary molding process without special restrictions, e.g., a melt molding process such as extrusion molding, injection molding, compression molding, press molding, rotation molding, transfer molding; a powder molding process such as compression molding, ram extrusion molding, paste extrusion molding, and isostatic molding; or an ordinary film forming method such as powder coating including electrostatic powder coating using coating powder, spray coating, spin coating, liquid dip coating, and roll coating.

In forming articles, a layer from the antistatic melt processible fluoropolymer compositions may be formed only in the area where the antistatic property is needed, thus the static property can be controlled by using only a small amount of the composition.

The articles made from the antistatic melt processible fluoropolymer compositions display stable antistatic character, thus they are expected to be used in devices and fields in which electrostatic problems are encountered, such as electronic copier parts and semiconductor production device parts as well as in the chemical industry, food processing industry, and the general science field.

For example, in the case of using these products as rotating parts for electronic copying machines, poor image problems such as discontinuities, also known as "holidays", and marks, can be overcome, compared with conventional high static parts. When used for hoses and pipes (including tubes) for transporting combustible materials, requiring antistatic properties, static formation and accumulation can be prevented, which reduces fire hazard. When used as peripheral articles in semiconductor production, such as chemical transport pipes, joints, chemical containers, and wafer carriers, static adhesion of microparticles in the air can be prevented. They can also be used for sheets, rods, fibers, packings, coating materials, and covering materials, such as copy roll covers used in copying machines and other imaging machines.

EXAMPLES

The examples are not intended to limit the present invention.

In the present invention, charge quantity was measured as shown below.

Charge Measurement

A compression-molded melt processible fluoropolymer sheet with a thickness of about 1 mm and size of about 4 cm×4 cm is subject to an applied voltage of 10 kV at 23° C. and relative humidity of 40% for 1 min. The applied voltage is removed, and residual charge after charge dissipation, referred to as residual charge hereinafter, is measured using the Static Honestmeter H-0110, a product of Shishido Electrostatic Co., Ltd., of Japan.

Application Example 1

PFA (melt flow rate of 30 g/10 min (at 372° C., 5000 g load according to ASTM D 1238)), product of Mitsui-DuPont Fluorochemicals Co. of Japan) is melt-blended with 4 wt % of a functional-group-containing melt processible fluoropolymer consisting of a terpolymer of tetrafluoroethylene, perfluoro(propyl vinyl ether) (PPVE), and CF2=CF[OCF2CF (CF3)]OCF2CF2CH2OH [9,9-dihydro-9-hydroxyperfluoro (3,6-dioxa-5-methyl-1-nonene] (PPVE content: 3.7 wt %, hydroxyl-group-containing monomer content: 1.1 wt %, and melt-flow rate: 15 g/10 min) in a twin-screw extruder (polymer temperature: 350° C.) to obtain a melt processible fluoropolymer composition. The functional-group-containing melt processible fluoropolymer of this example can be prepared according to the general polymerization methods disclosed in U.S. Pat. No. 5,134,211, using the appropriate monomers.

The melt processible fluoropolymer composition is pelletized and compression-molded at 350° C. to obtain a sheet with a thickness of about 1 mm. This sheet is measured for residual charge using the Static Honestmeter. Results are summarized in Table 1.

Application Examples 2-4

Melt processible fluoropolymer compositions are prepared as in Application Example 1 but with functional-group-containing melt processible fluoropolymer mixing ratios of 8 wt %, 12 wt %, and 16 wt %, made into sheets, and then measured for residual charge. Results are summarized in Table 1.

Comparative Example 1

A sheet is prepared as in Application Example 1 with omission of the functional-group-containing melt processible fluoropolymer in Application Example 1 and using the PFA (melt flow rate: 30 g/10 min (372° C., 5000 g load), product of Mitsui-DuPont Fluorochemicals Co., Ltd.) residual charge after is measured. Results are summarized in Table 1.

Reference Example 1

Carbon-black-compounded electrically conductive PFA pellets (PF-018-580, product of Mitsui-DuPont Fluorochemicals Co., Ltd; surface resistance: $9.2^9$ Ω/square) were compression-molded at 350° C. to obtain a sheet with a thickness of about 1 mm, then measured for residual charge using the Static Honestmeter. Results are summarized in Table 1.

Application Example 5

A 96 wt % PFA-4 wt % functionalized PFA blend is made by blending 30 wt % aqueous dispersion of PFA (melt flow rate (372° C., 5000 g load): 30 g/10 min, product of Mitsui-DuPont Fluorochemicals Co., Ltd.) with 20 wt % aqueous dispersion of a functional-group-containing melt processible fluoropolymer of a terpolymer of tetrafluoroethylene, perfluoro(propyl vinyl ether) (PPVE), and 9,9-dihydro-9-hydroxyperfluoro(3,6-dioxa-5-methyl-1-nonene) (PPVE content: 3.7 wt %, hydroxyl-group-containing monomer content: 1.1 wt %, melt-flow rate: 15 g/10 min), coagulated, and granulated to obtain granules of about 500 μm. The granules are heat-treated at 290° C. and pulverized to obtain a powder coating material of about 20 μm in size.

The above melt processible fluoropolymer composition powder coating material is electrostatically coated (baking temperature: 350° C.) to obtain a coating with a thickness of about 1 mm. Residual charge is measured using the STATIC HONESTMETER. Results are summarized in Table 1.

TABLE 1

|  | PFA (A) (wt %) | Functional group-containing PFA (B) (wt %) | Residual Charge (kV) |
|---|---|---|---|
| Application Example 1 | 96 | 4 | 1.12 |
| Application Example 2 | 92 | 8 | 0.61 |
| Application Example 3 | 88 | 12 | 0.26 |
| Application Example 4 | 84 | 16 | 0.15 |
| Application Example 5 | 96 | 4 | 1.18 |
| Comparative Example 1 | 100 | 0 | 2.35 |
| Reference Example 1 | 100 | 0 | 0.06 |

As shown in Table 1, the charge decreases with an increasing content of the functional-group-containing melt processible fluoropolymer (B) (Comparative Example 1, Application Examples 1-4). Thus, it is seen that the charge can be controlled to the desired value by varying the content of functional-group-containing melt processible fluoropolymer (B).

Although the carbon-black-containing electrically conductive PFA (Reference Example 1) has a residual charge of 0.06 kV, said carbon black-containing electrically conductive PFA is not transparent, and when used as liquid-transporting pipes, the flow of liquid chemical inside the pipes cannot be confirmed, and separation of carbon black causes soiling problems. On the other hand, the antistatic melt processible fluoropolymer compositions of the present invention are almost transparent, thus the flow of liquid chemical can be confirmed. In addition, articles of the carbon-black containing PFA are liable to release carbon black to material with which they come in contact and also as the result of wear and age. Such release would have a detrimental effect on the cleanliness and purity of processes and materials made using carbon-black containing articles.

What is claimed is:

1. Antistatic article having a surface exposed to static electrical charging, comprised of antistatic melt-blended melt processible fluoropolymer composition consisting of: (A) a first melt processible fluoropolymer and (B) 1-20 wt % of a second melt processible fluoropolymer having at least one functional group selected from the group consisting of hydroxyl group present as the alcohol group —CH$_2$OH and nitrile group present as the cyanide group —CN and based on the total weight of (A) and (B), said fluoropolymer composition constituting the entire polymer content of said article, said second melt processible fluoropolymer having a melt viscosity in the range of $10^3$ to $10^5$ Pa·s, said antistatic article exhibiting a residual charge of less than about 1.5 kV.

2. Antistatic article having a surface exposed to static electrical charging, consisting of antistatic melt-blended melt processible fluoropolymer composition consisting of: (A) a first melt processible fluoropolymer and (B) 1-20 wt % of a second melt processible fluoropolymer having at least one functional group selected from the group consisting of hydroxyl group present as the alcohol group —CH$_2$OH and nitrile group present as the cyanide group —CN and based on the total weight of (A) and (B), wherein said article is molded, said second melt processible fluoropolymer having a melt viscosity in the range of $10^3$ to $10^5$ Pa·s, said antistatic article exhibiting a residual charge of less than about 1.5 kV.

3. Semiconductor production apparatus containing at least one article of claim 2.

4. Antistatic article of claim 2 wherein said molded article is a fiber.

5. Fabric containing the fiber of claim 4.

6. Antistatic article of claim 2 wherein said molded article is a film.

7. Covering material of the film of claim 6.

8. Rotating article having the covering material of claim 7 as the surface thereof.

9. In the process of dissipating electrostatic charge on the exposed surface of an article consisting of fluoropolymer by dispersing electrically conductive material into said fluoropolymer, the improvement consisting of substituting for said fluoropolymer having said electrically conductive material dispersed therein, a composition consisting of a melt blend of: (A) a first melt processible fluoropolymer and (B) about 1-20 wt % of a second melt processible fluoropolymer having at least one functional group selected from the group consisting of hydroxyl present as the alcohol group —CH$_2$OH and nitrile present as the cyanide group —CN and based on the total weight of (A) and (B), said second melt processible fluoropolymer having a melt viscosity in the range of $10^3$ to $10^5$ Pa·s, said article exhibiting a residual charge of less than about 1.5 kV.

10. In the process of claim 9, wherein said article is a free-standing film or tube.

11. Antistatic article having an exposed surface comprised of polymer, said polymer consisting of a melt blend of (A) a first melt processible fluoropolymer and (B) about 1-20 wt % of a second melt processible fluoropolymer having at least one functional group selected from the group consisting of —CH$_2$OH and —CN for making said article antistatic, said wt % being based on the total weight of (A) and (B) and said polymer being free of electrically conductive material and constituting the entire polymer content of said article, said second melt processible fluoropolymer having a melt viscosity in the range of $10^3$ to $10^5$ Pa·s, said antistatic article exhibiting a residual charge of less than about 1.5 kV.

12. Pellets consisting of melt blended polymer, said polymer consisting of (A) a first melt processible fluoropolymer and (B) about 1-20 wt % of a second melt processible fluoropolymer having at least one functional group selected from the group consisting of —$CH_2OH$ and —CN and based on the total weight of (A) and (B), said polymer being free of electrically conductive material, said second melt processible fluoropolymer having a melt viscosity in the range of $10^3$ to $10^5$ Pa·s, said polymer exhibiting a residual charge of less than about 1.5 kV.

* * * * *